Oct. 5, 1943.    S. NADELSON    2,331,132
HOSE CLAMP
Filed March 17, 1943
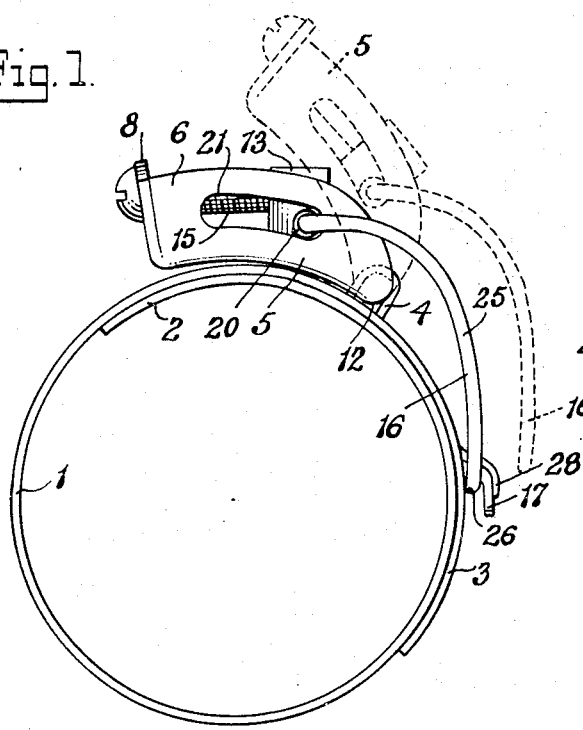
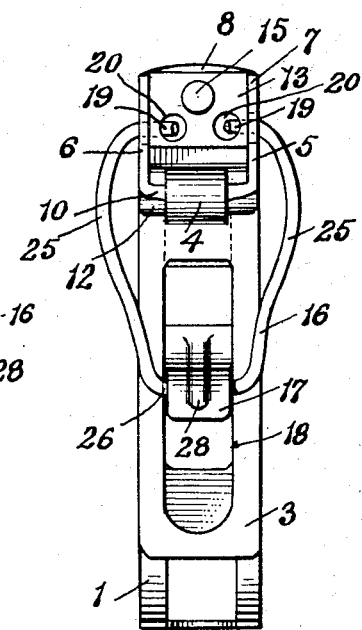
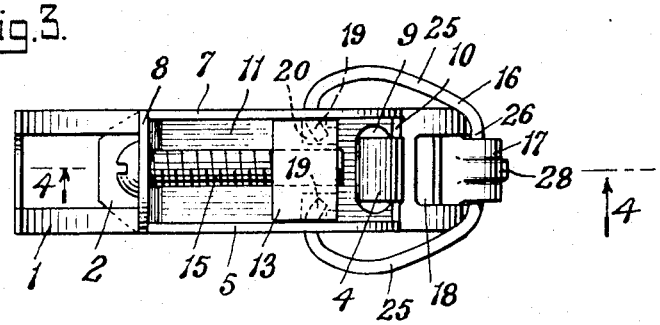
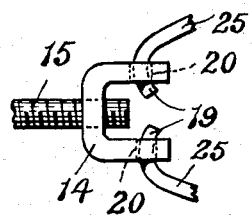
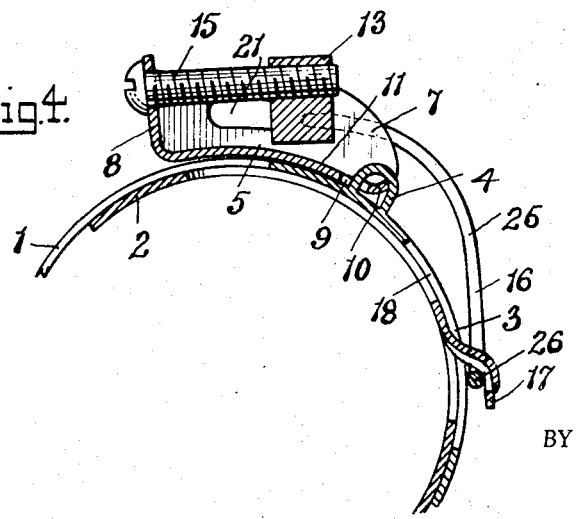
INVENTOR.
Samuel Nadelson
BY Harry Radzinsky
Attorney Patented Oct. 5, 1943

2,331,132

UNITED STATES PATENT OFFICE 2,331,132

HOSE CLAMP

Samuel Nadelson, New York, N. Y.

Application March 17, 1943, Serial No. 479,419

7 Claims. (Cl. 24—19)

This invention relates to hose clamps, or clamps adapted for other purposes, and particularly for imparting a clamping force upon pipes, tubes or other cylindrical objects. One of the primary objects of the present invention is to provide a clamp in which a hinged locking lever is provided on one end portion of the hose-encircling strap, said lever carrying an adjustable element or nut connected to a spring link adapted to be removably engaged with a hook on the other end portion of the strap, the adjustable element or nut being adjusted relatively to the locking lever by a screw to place the link under tension. With this novel arrangement the screw and adjustable element or nut are constantly maintained together regardless of whether the clamp is in operative or inoperative position.

Another object of the invention is to provide a clamp which, in spite of being applied very tightly, can be instantly freed or loosened from its clamping position by a simple prying action imparted to a locking lever by a screw driver or other tool. A still further object of the invention is to provide a clamp in which the tension of a link is regulated after the clamp is in place, whereby the clamp may be placed in position readily and will hold itself in place, and since it will be thus self-supporting, both hands of the installer are free to tighten the clamp.

More particularly, the invention contemplates the provision of a hose-embracing strap having overlapped end portions, with at least one hooked element projecting from one of said end portions, and a locking lever pivoted on the other; a nut or similar adjustable element is carried on the lever, and pivotally attached to the nut is a bowed spring link having a free end for detachable engagement with the hook, and when said link is extended between the nut and the hook it is capable of having its tension regulated by adjusting movement of the nut relative to the lever.

In the accompanying drawing, forming a part hereof,

Fig. 1 is a side elevation of a clamp constructed in accordance with the invention;

Fig. 2 is a front view of the same;

Fig. 3 is a top plan view of the clamp;

Fig. 4 is a sectional view on the line 4—4 of Fig. 3, looking in the direction of the arrows; and Fig. 5 is a plan view of a modified form of adjusting nut.

In the drawing, the apertured band or strap which encircles the hose or other object to be clamped, is disclosed at 1, said strap being provided with the overlapped end portions designated at 2 and 3. The outermost of said end portions, or that indicated at 3, is formed with a radially projecting loop member 4 constituting part of a pivotal attachment for the locking lever shown at 5.

The locking lever 5 is of trough shape or channel formation, being thus provided with the spaced, upstanding parallel side walls 6 and 7 and an end wall 8, the lever being preferably, but not necessarily, formed from sheet metal and the several walls produced by bending the metal sections to the required position. The bottom 11 of the lever 5 is formed with an aperture 9 to permit passage of the loop member 4 and to provide a cross-bar 10 at the forward end of the lever, said bar being embraced by the loop member. The forward end of the lever 5 is shaped or rounded, as indicated at 12, to permit free raising movement of the lever, and the outer surface of the bottom 11 of the lever is curved to substantially conform to the surface of the strap 1.

Disposed within the channel of the locking lever 4, and thus located between the side walls 6 and 7 thereof, is an adjusting nut 13, which may be of the solid block formation shown in Figs. 1 to 4, inclusive, or of the U-shape seen at 14 in Fig. 5. Said nut is internally threaded to engage with the adjusting screw 15 that is freely rotative in the end wall 8 of the locking lever. With this arrangement, it will be obvious that as the screw is turned, the nut 13 can be adjusted to or from the end wall 8.

At 16 is shown the spring link, which is substantially of U-shape, and thus has longitudinally extending side portions 25 connected at one end by the part 26 that is adapted to be engaged under a ribbed hook member 17 formed on, and projecting from, the end portion 2 of the strap 1. A slot 18, formed in the end portion 3 of the strap, allows passage of the hook member 17, as seen in Fig. 4.

At the other end of the spring link 16, the ends of the side portions 25 are curled inwardly, as indicated at 19, these curled portions engaging in apertures 20 formed in the opposite sides of the nut. Elongated slots 21 formed in the side walls 6 and 7 of the locking lever permit passage of the ends 19 of the side portions 25 of the spring link.

From the foregoing, the operation of the improved clamp will be readily understood. In applying the clamp, the locking lever is in raised position, or as partly shown in dotted lines in Fig. 1, and the end part 16 of the spring link is engaged under the hook member 17. When this has been done, the locking lever is swung toward the strap 1 and brought against the face of the same as shown in full lines in Fig. 1. In this closed position of the clamp, it will hold itself in place around the hose or other embraced element, and the clamp can then be readily tightened to the extent required by adjustment of the nut 13 through rotation of the screw 15. Since the spring link 16 is of resilient material, such as heavy resilient wire, and has its side portions 16 of bowed formation, it can flatten sufficiently under the tension imposed upon it by adjustment of the nut 13, to hold the clamp with extremely powerful clamping action around the hose.

Despite the fact that the clamp can be thus adjusted to impart a very powerful clamping action, its release from such powerful embrace can be instantly effected, by inserting a tool such as a screw-driver under the locking lever 5 and imparting a prying action, which will serve to raise the locking lever to an extent required to free the link 16 from engagement with the hook 17, thus permitting removal of the clamp without disturbing the adjusted position of the nut 13. This is of considerable importance, since the threads on the adjusting screw are likely to rust and corrode after long use, rendering turning of the screw difficult when it is desired to replace the clamp with a new one. Thus, the removal of the clamp by simple prying action enables speedy replacement of these clamps, while at the same time, an extremely powerful clamping action can be obtained by the screw-and-nut adjustment of the tension of the spring link.

In the embodiment of the invention disclosed, the inner end portion 2 of the strap 1 is formed with a single hook member 17, said hook member being pressed out of the body of the strap and strongly reinforced with the longitudinally-extending rib 28. It will be understood that more than one of these hooks 17 may be employed in cases where extraordinary degrees of adjustment of the clamp around hose or other objects of widely different diameters are desired.

Various other modifications of the structure described may be readily made, as will be understood by those skilled in this art, without departing from the spirit of the invention.

What I claim is:

1. A clamp of the character described comprising, an annular strap provided with overlapped end portions, one of said end portions being provided with a projecting hook, a locking lever pivotally mounted on the other end portion, a link having one end adapted for engagement with the hook, an adjusting member mounted for slidable adjustment on the locking lever, the second end of the link being connected to said adjusting member, and means on the lever for adjusting the position of the adjusting member on the lever to control the tension of the link.

2. A clamp of the character described comprising, an annular strap provided with overlapped end portions, one of said portions having an extended projection, a locking lever pivotally attached to the other end portion, an adjusting nut carried by said lever, said lever being provided with a channel in which said nut is movable, a screw mounted in the lever and in threaded engagement with the nut, a link provided with an end for detachable engagement with the projection, said link having its second end pivotally connected to the nut whereby said link may be placed under tension by adjustment of the nut.

3. A clamp of the character described comprising, an annular strap provided with overlapped end portions, a hook formed from the body of the strap and projecting radially therefrom in one of said end portions, a pivoted locking lever mounted on the other end portion, said lever having side walls and an end wall, an adjusting nut slidably adjustable between the side walls, a screw rotative in the end wall and threadably engaging the nut, a spring link having an end adapted for detachable engagement with the hook, said link having longitudinally extending side portions terminating at one end in hooks for engagement with the nut, the side walls of the lever being slotted to permit of the passage of the side portions of the link for engagement with the nut.

4. A clamp of the character described comprising, an annular strap having overlapped end portions, a lever pivoted on one of said end portions, a hook provided on the other end portion, a shiftable element carried by the lever and means for setting the position of the same thereon, a link having one end adapted for engagement with the hook and its other end pivotally attached to the shiftable element.

5. A clamp of the character described comprising, a strap having overlapped ends, one of said ends being apertured, a hook on the other end extending through the aperture in the first end, a channelled pivoted lever carried by the other end, a nut disposed in the channel of said lever and adjustable relatively to the lever, means for adjusting said nut in the channel and a link having one end attached to the nut and its other end adapted for detachable engagement with the hook, said link being resilient and of bowed formation and capable of flattening movement by adjustment of the nut.

6. A clamp of the character described comprising, a strap having overlapped ends, a hook on one end, a lever pivoted on the other end, a nut adjustably carried by the lever, a screw on the lever and engaging the nut for adjustment of the same, a bowed spring link having one end adjustably attached to the nut and its other end adapted for detachable engagement with the hook, the tension of said link between the hook and nut being regulated by adjustment of the nut.

7. A clamp of the character described comprising, an annular strap having overlapped ends, the outermost end being provided with a radially extending loop, a lever pivoted at one of its ends in said loop, the innermost end of the strap having a radially extending hook, the outermost end being apertured, said hook extending through and being adjustable in the aperture, an adjusting nut carried by the lever, a screw carried by the lever and threadably engaging the adjusting nut, and a link in the form of a loop pivotally carried by the adjusting nut, and having a free end adapted to be engaged under the hook.

SAMUEL NADELSON.